United States Patent [19]

Offiler et al.

[11] Patent Number: 5,068,589
[45] Date of Patent: Nov. 26, 1991

[54] SUPPLEMENTAL AUTOMOTIVE VEHICULAR HEATER SYSTEM AND METHOD OF PROVIDING SAME

[75] Inventors: Stephen B. Offiler, Attleboro; Peter G. Berg; Keith W. Kawate, both of Attleboro Falls, all of Mass.

[73] Assignee: Texas Instruments Incorporated, Dallas, Tex.

[21] Appl. No.: 342,054

[22] Filed: Apr. 24, 1989

Related U.S. Application Data

[60] Division of Ser. No. 181,457, Apr. 14, 1988, which is a continuation of Ser. No. 69,665, Jul. 6, 1987, abandoned, which is a continuation of Ser. No. 852,484, Apr. 16, 1986, Pat. No. 4,678,982.

[51] Int. Cl.⁵ .............................. B60L 1/02; H02J 7/14
[52] U.S. Cl. ........................................ 322/7; 219/202; 307/16; 322/90
[58] Field of Search .................... 322/7, 8, 90, 81; 307/16; 219/202

[56] References Cited

U.S. PATENT DOCUMENTS

| | | | |
|---|---|---|---|
| 3,469,072 | 9/1969 | Carlson | 219/202 |
| 4,214,198 | 7/1980 | Schneider | 322/90 X |
| 4,262,242 | 4/1981 | Glennon | 322/90 X |

Primary Examiner—R. J. Hickey
Attorney, Agent, or Firm—John A. Haug; James P. McAndrews; Melvin Sharp

[57] ABSTRACT

A supplementary heating system particularly suitable for an automotive vehicle comprises a step down transformer coupled to the stator windings of the vehicle's alternator and a positive temperature coefficient (PTC) of resistivity heater electrically connected intermediate the stator windings and the transformer in parallel with the transformer. Due to the presence of the transformer the voltage regulator causes the alternator to operate at a higher than customary voltage to provide the conventional 14.4 volts for the vehicle's normal electrical loads with the high voltage used to energize the heater. The heater can be in the form of a so-called "honeycomb" having a plurality of parallely extending passages or cells disposed in the air stream going from the main heater into the passenger compartment and can be either a multiphase, single phase or direct current type. In one embodiment the transformer is switched into and out of electrical the transformer is alternator dependent on the energization of the heater, while in another embodiment the transformer is always electrically coupled to the alternator with the heater switched into and out of the circuit as desired.

2 Claims, 4 Drawing Sheets

SUPPLEMENTAL AUTOMOTIVE VEHICULAR HEATER SYSTEM AND METHOD OF PROVIDING SAME

This application is a division of Ser. No. 07/181,457, filed Apr. 14, 1988, which is a continuation of application Ser. No. 069,665, filed July 6, 1987, now abandoned, which in turn is a continuation of application Ser. No. 852,484, filed Apr. 16, 1986, which issued as U.S. Pat. No. 4,678,982.

BACKGROUND OF THE INVENTION

The present invention relates generally to automotive vehiclar heaters and more specifically to supplemental heaters for such vehicles.

At the present time automotive vehicles conventionally are supplied with heating systems which utilize heat produced by the vehicle's engine. The system includes a heater core comprising a conduit which mounts heat exchange fins. Water heated by the engine and transported through the conduit from the engine block gives up its heat through the fins to air which is caused to be passed among the fins. The heater core may, for example, be configured to fit into a rectangular passage in the order of six by eight inches positioned in a duct which passes through the fire wall separating the engine from the passenger compartment. A fan positioned upstream of the heater core is adapted to force a flow of air through the heater core and into the passenger compartment. The fan typically is provided with a selection of speeds so that an operator can vary the volume of air being directed into the passenger compartment. The air passage typically includes a path which extends directly through the heater core as well as a parallel path which bypasses the heater core with an adjustably positioned vent door (heater temperature control) provided to control the proportion of air directed through the heater.

In vehicles having relatively large engines, such as 6 or 8 cylinder engines, the heating systems are generally considered adequate, once warmed up, in providing sufficient heat to the passenger compartment. However, in vehicles having smaller engines, such as 4 cylinder engines, the engines are sometimes unable to produce enough heat to satisfactorily warm up the passenger compartment on extremely cold days. This problem is actually becoming more acute as the engines are being improved to be more efficient and therefore give up less waste heat.

Another problem presented by present day automotive heating systems is the time interval which exists between initial start up and when thermal equilibrium is eventually achieved. In some cars this may take ten or fifteen minutes or even longer depending on the particular ambient temperature involved. Since the duration of an average trip is only in the order of twenty minutes or so, much of the trip is conducted in an uncomfortable temperature condition for the operator and passengers.

Over the years various attempts have been made to deal with these problems however each has had limitations which have militated against its usefulness and general acceptance.

For example, gasoline fired heaters are available but they are bulky, expensive to provide and maintain and they are slower than desirable. Use of exhaust gas heat has been suggested but problems with eliminating any possibility of carbon monoxide gas leaking into the passenger compartment along with the relatively long warm up time required have made this approach unsatisfactory.

Electric heaters have been proposed for supplemental defrost heaters and the like but providing suitable energizing means has presented a problem which has not yet been satisfactorily solved. Typically an automobile is provided with an alternator which has a field winding adapted to be mechanically rotated by the engine to produce electric current to run the various electric loads of the vehicle. Since most of the electric loads of the car are sensitive to voltage variations a voltage regulator is provided to maintain the voltage level, within a very narrow range, at 14.4 volts (DC), suitable for most of the electric loads. The alternator is adapted to provide the voltage level despite being subjected to a wide variation of energization of the electric loads and varying mechanical input, e.g. engine speeds ranging from idle to racing. A typical large automotive alternator, operated to provide 14.4 volts, produces in the order of 1500 watts and since the electric loads normally consume 1000 or more watts, there is little power available to provide desired supplemental heat.

However an alternator can be run at a higher voltage to increase its output power. For example, it has been proposed that a deicing heater in a windshield be heated by energizing a resistive clear coating between two layers of glass. Since this requires a relatively large amount of power, the proposal entails disconnecting the alternator from the battery, then running the alternator at a higher voltage to provide sufficient power for the windshield heater and to energize the remaining electric loads in the car directly from the battery. In this system the heater can only be energized while the car is in the "PARK" position. Since the car cannot be operated while the heater is in operation this would be an unsuitable approach as a way to supplement the heater for the passenger compartment, particularly since it can only address the warm up interval and not the problems associated with continuous operation of smaller, 4 cylinder engines.

Another proposal has involved the provision of dual alternators, one operated at 14.4 volts for the normal automotive loads and the second at an elevated voltage for a supplemental heater. This, however, is not only costly initially, it is the type of component subject to wear and eventual replacement representing a significant cost item. In addition this would be relatively bulky and heavy.

Yet another problem associated with alternator powered heaters involves the selection of a heater which would work satisfactorily with the characteristics of the alternator. That is, the heater must be operable with certain widely varying variables. For example, if used as a supplemental heater to add heat to the air stream passing through the main heater core, the heater must be capable of operating with the fan off as well as with the fan on at its maximum position (full circulation). A compromise in performance is usually required in order to avoid overheating and burn out of the heater. That is, the heater must be constructed so as to be able to generate heat without burning out with a minimum of heat dissipation when the fan is off as well as when the fan increases heat dissipation.

Voltage variations pose another problem for the selection of a heating system. For example, when the engine slows down or idles, the alternator voltage tends to drop. With a conventional wire heater having an essentially fixed electrical resistance, a change in voltage has an effect on heat produced which is dependent on the square of the voltage variation so it becomes very difficult to maintain a desirable even heat output.

It is therefore an object of the invention to provide an improvement in the performance of a heating system of an automotive vehicle. Another object is the provision of a method and apparatus to supplement the main heating system of an automotive vehicle so that the waiting time between initial energization and a thermal equilibrium for a selected temperature in the passenger compartment is significantly reduced. Another object is the provision of a method and apparatus to supplement the main heating system of an automotive vehicle which otherwise has difficulty in achieving a satisfactory comfort level in cold ambient conditions. Yet another object is the provision of a supplemental heating system which is relatively inexpensive yet extremely reliable, one which can provide even heat output even with changing voltage conditions and one which minimizes changes in currently employed automotive components and does not interfere with the normal operation of the vehicle.

SUMMARY OF THE INVENTION

Briefly, in accordance with the invention, a transformer is coupled to the stator windings of the alternator of the vehicle so that the voltage regulator forces the alternator to operate at an elevated voltage to realize greater output power from the alternator. The high voltage power is tapped off intermediate the stator windings and the transformer and is used to energize an electric heater to supplement the main heater of the vehicle.

According to a feature of the invention in a first embodiment a polyphase, typically a three phase supplemental heater having a positive temperature coefficient of resistivity is coupled directly to the high voltage while in a second embodiment a direct current supplemental heater having a positive temperature coefficient of resistivity is coupled to the high voltage through a rectifier.

According to another feature of the invention the supplemental heater is in the form of a so-called honeycomb configuration having a plurality of passages or cells through which air circulated by the heater fan is caused to pass.

According to yet another feature a double throw relay is provided for each phase of the transformer having a common terminal connected to the input of the rectifier which provides power to the automotive loads. Each relay has one terminal connected to a point intermediate a respective alternator stator winding and a single throw switch whose other side is connected to the three phase heater and input of the transformer. The other terminal is connected to the output of the transformer. Thus when the heater is not energized, the alternator is operated in a conventional manner and when the heater is energized, the relays are switched so that the transformer is in the circuit forcing the alternator to operate at an elevated voltage level in order to maintain the desired 14.4 volt level for the other automotive electric loads.

According to another embodiment of the invention rather than employing relays to switch the main load current of the automobile, single throw switches or relays are placed in at least two lines leading from the stator winding to the three phase heater so that the alternator is always operated at an elevated voltage whether or not the heater is energized.

According to another feature of the invention the three phase heater comprises a plurality of honeycomb elements arranged in a frame adapted to be placed in an air passage or duct so that the air will pass through open cells formed in the honeycomb elements. The elements are electrically connected in a delta configuration but physically disposed in the frame to provide a generally even electrical load among the phases despite fluid flow variations across the cross section of the duct.

BRIEF DESCRIPTION OF THE DRAWINGS

Other objects, features, advantages and details of the supplemental heater system and method of providing same provided by this invention appear in the following detailed description of preferred embodiments of the invention, the detailed description referring to the drawings in which:

FIG. 1a is a broken away schematic diagram showing a modification of the FIG. 1 system;

DESCRIPTION OF THE PREFERRED EMBODIMENTS

Figures 1, 1D:
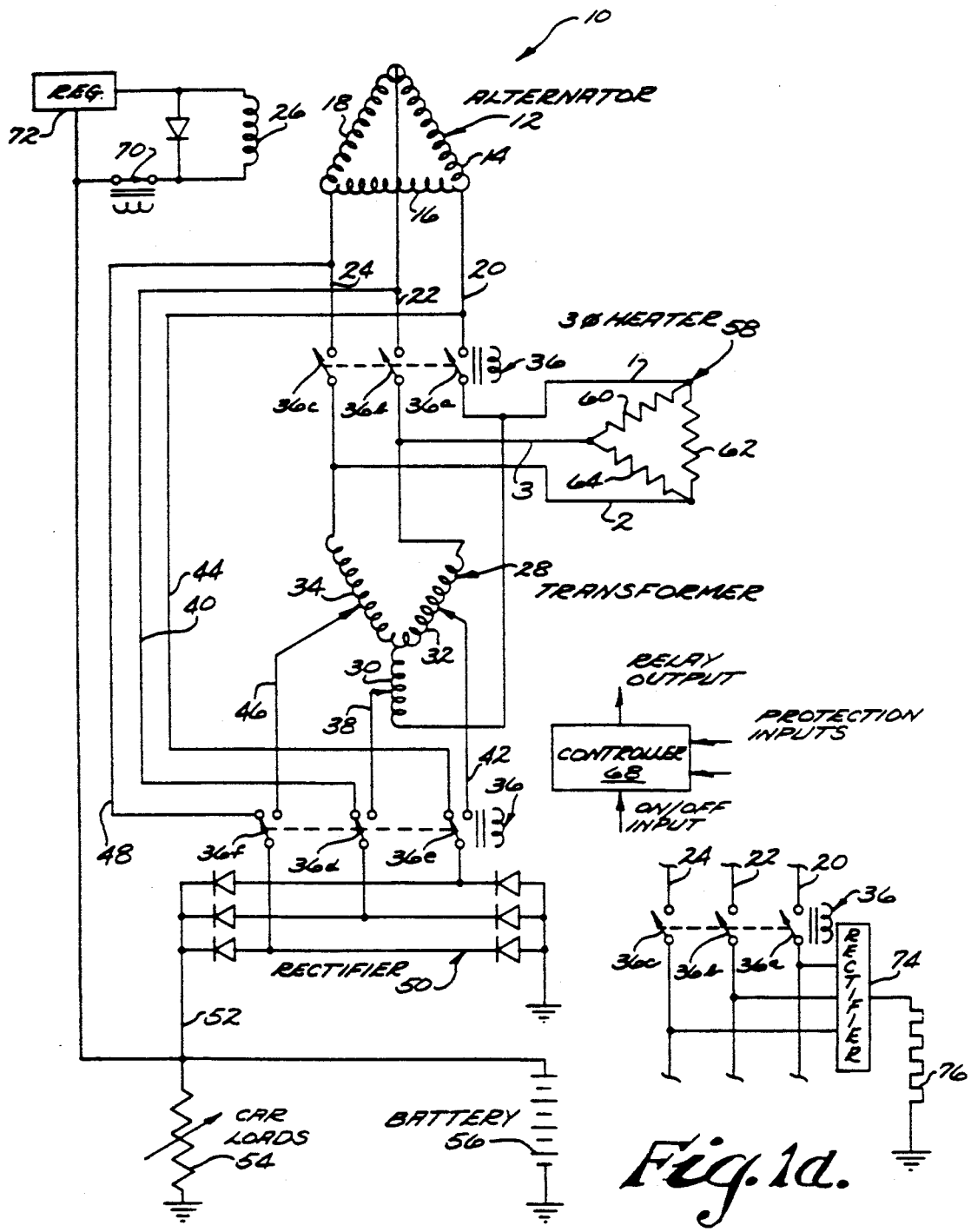
FIG. 1 is a schematic diagram showing a supplemental heater system made in accordance with the invention.

Referring to the drawings, numeral 10 refers generally to the heating system made in accordance with a first preferred embodiment of the present invention. A conventional automotive alternator 12 such as a Delco-Remy CS 144, 120 ampere alternator has three delta connected stator windings 14, 16, 18 with output line 20 connected between windings 14, 16, output line 22 connected between windings 14 and 18 and output line 24 connected between windings 16 and 18. A field winding 26 is adapted to be rotated by the vehicle's engine adjacent to the stator windings in a known manner so that direct current caused to flow through field winding 26 upon rotation thereof will generate current in the stator windings. A transformer 28 comprising wye connected windings 30, 32, 34 is arranged so that winding 30 is connected to output line 20 through a single throw switch 36a, winding 32 is connected to output line 22 through a single throw switch 36b and winding 34 is connected to output line 24 through a single throw switch 36c. Switches 36a, b and c are ganged together so that they will all be in the opened or closed position at the same time and are also tied to the operation of double throw switches 36d, e and f. Switch 36d has one terminal connected to winding 30 through line 38 and its other terminal connected to alternator output line 22 through line 40. Switch 36e has one terminal connected to winding 32 through line 42 and its other terminal to alternator output line 20 through line 44. Switch 36f has one terminal connected to winding 34 through line 46 and its other terminal connected to alternator output line 24 through line 48. The common terminals of switches 36d, e and f are all coupled to conventional rectifier 50 which has an output line 52 connected to the various vehicle electric loads 54 (lights, radio, instruments, etc.) in parallel with battery 56. Switches 36d, e and f are ganged together so that they all assume like positions as will be explained further below.

Figure 2:
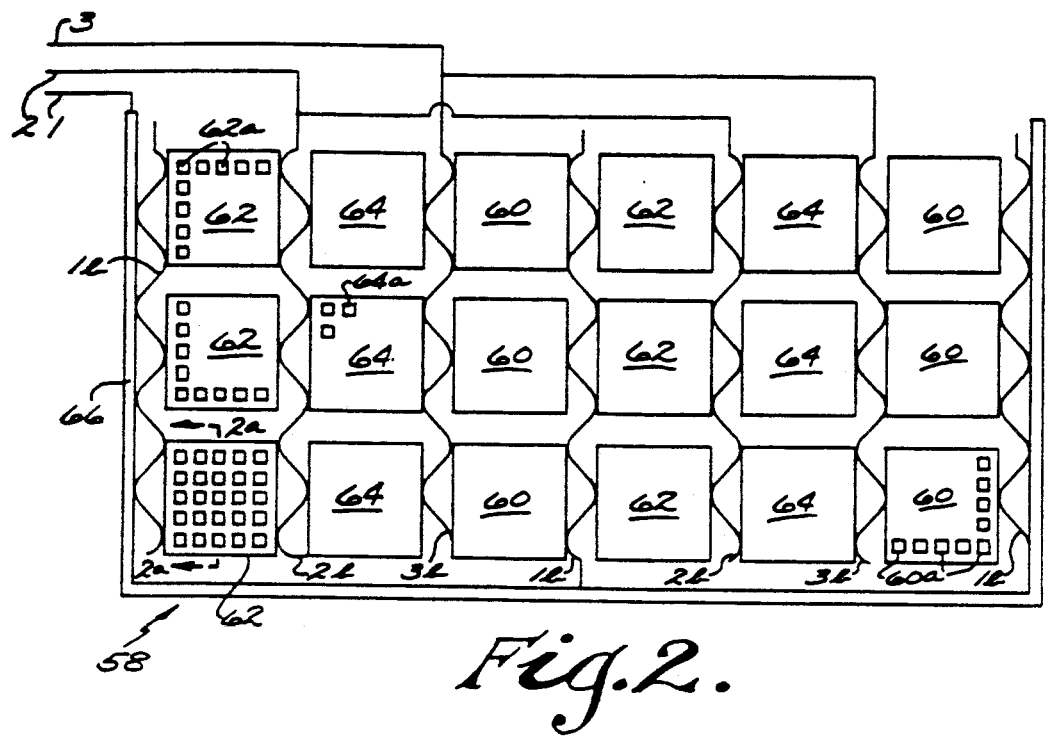
FIG. 2 is a schematic plan view of a heater configuration particularly useful with the FIG. 1 embodiment.
Figure 2A:
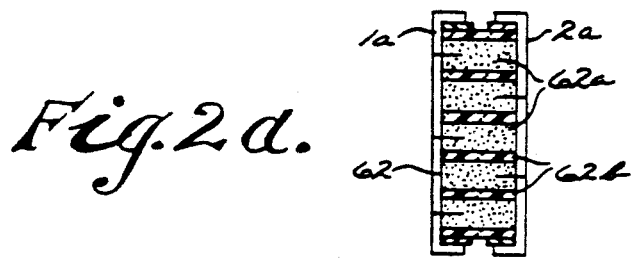
FIG. 2a is an enlarged cross sectional view taken on lines 2a—2a of FIG. 2.

A three phase heater assembly 58 comprising heater sections 60, 62 and 64 are connected to the alternator output lines intermediate switches 36a, b and c and transformer 28. Heating sections 60, 62 and 64 are shown to be connected in a delta configuration with section 60 connected between output lines 20 and 22, section 62 between output lines 20 and 24 and section 64 between output lines 22 and 24. Preferably heater assembly 58 is comprised of self-regulating electrically resistive material having a positive temperature coefficient (PTC) and is formed as a body having a honeycomb configuration in which a plurality of parallely extending passages or cells extend between opposite faces of the body. With particular reference to FIGS. 2 and 2a heater assembly 58 comprises a plurality of identical bodies 60, 62 and 64 of ceramic material or the like of positive temperature coefficient of resistivity having a large number of passages 60a, 62a and 64a respectively, extending through the body in side-by-side parallel relation to each other between opposite faces or ends of the body. The passage walls (see 62b in FIG. 2a) define thin webs of the resistance material between adjacent passages in the body and the walls of the passages are of uniform thickness from end to end.

Preferably the bodies comprise a ceramic material such as lanthanum doped barium titanate or the like in which the material is adapted to display a sharp, anomolous increase in resistivity when the body is heated to a particular temperature and may be of the type described in U.S. Pat. No. 4,264,888.

A conductive coating is disposed on the walls of the passages with the coating interconnected so that alternate cells are connected to two separate electrical conductors, as shown schematically in FIG. 2a, conductors 1a and 2a.

Figure 3:
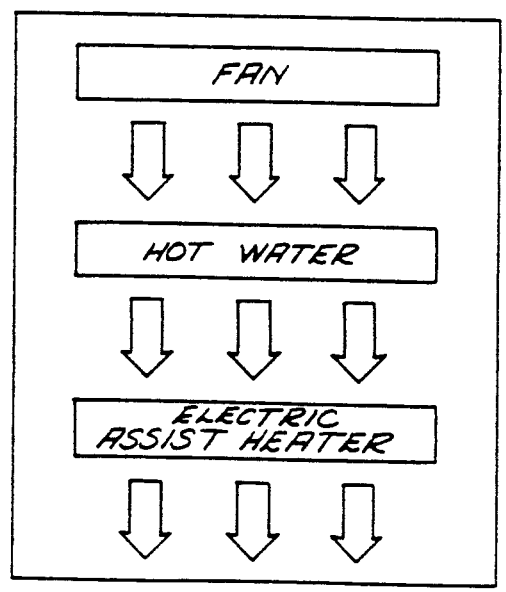
FIG. 3 is a schematic flow diagram showing the main components of the heater system.

Bodies 60, 62 and 64 are physically mounted in a suitable frame shown schematically in FIG. 2 by numeral 66, which is adapted to be placed across an air stream in a duct carrying air from the main heater fan to the passenger compartment as indicated in FIG. 3.

Frame 66 is shown to be an electrical conductor however it will be understood that in practice the frame could be constructed of electrically insulative material suitable for physically mounting the bodies and which in turn mounts a suitable electrical conductor.

As seen in FIG. 2, from left to right, a first group of bodies 62 are disposed in electrically parallel relation between electrical connectors 1b and 2b. A second group of bodies 64 are disposed in electrically parallel relation between electrical connectors 2b and 3b and a third group of bodies 60 are disposed in electrically parallel relation between electrical connectors 3b and 1b. These three groups are then duplicated to provide heater bodies across the entire cross sectional surface of the frame. Connector 1b is electrically connected to conductor 1 through frame 66 and connectors 2b and 3b are connected to conductors 2 and 3 respectively. Thus the bodies are arranged so that two spaced groups of bodies 62 will conduct current through webs 62b from alternator winding 16, spaced groups of bodies 64 will conduct current through its webs from alternator winding 18 and spaced groups of bodies 60 will conduct current through its webs from alternator winding 14. The groups of each body are preferably spaced from one another in order to provide a balanced load in the event that air flow varies across the cross sectional area of the duct. It will be understood that if desired, a greater number of spaced groups of bodies for each phase could be provided to increase the balance among the phases. Further, the number of bodies within the groups can be varied as long as it is varied in like manner in all the groups.

Turning back to FIG. 1, a controller 68 is used to control energization of heater assembly 58. When an input is entered into the controller as by an operator turning on a switch to energize the heater, an output is transmitted to an electromagnetically operated relay 70 in series with field winding 26 to open the relay contacts deenergizing the field winding to interrupt generation of electricity by the alternator. Immediately following deenergization of field winding 26 the controller transmits a signal to relay 36 to close switches 36a, 36b and 36c and moving switches 36d, 36e and 36f to the position in which they connect rectifier 50 to transformer 28. Once this occurs relay contacts 70 are reclosed to energize the field winding. This sequence can occur in a fraction of a second. Due to the addition of the transformer to the circuit the voltage regulator 72 now causes the alternator to operate at a higher voltage in order to maintain the selected 14.4 volts for car loads 54. This higher voltage results in greater power availability, as will be discussed in greater detail below and is used to power the heater assembly 58. When it is no longer desired to have heater assembly 58 energized inputting the controller 68 with an off signal either manually or automatically will again cause relay 70 to open its contacts thereby deenergizing field winding 26 at which point relay 36 is actuated to open switches 36a, 36b and 36c and move switches 36d, 3e and 36f to disconnect the rectifier from the transformer and connect it directly to the alternator via lines 40, 44, 48. Relay contacts 70 are then closed to reenergize the field winding which will then cause the alternator to operate at its lower voltage range to provide the selected 14.4 volts. Although it is not essential to deenergize the field winding before actuation of relay 36, it is preferred to do so since relay 36 carries the main electrical current for the various vehicle loads and switching the relays at a time when they are not carrying current enhances their longevity.

If it is desired to provide various protective devices for the component parts of the system, they can provide an input to controller 68 to prevent energization of the heating assembly in the event of some malfunction. For example, over temperature protection for the transformer can be provided by placing a protector in each transformer winding and connecting the protectors in series so that an overtemperature condition in any winding will deenergize the heating assembly through control 68.

Figure 4:
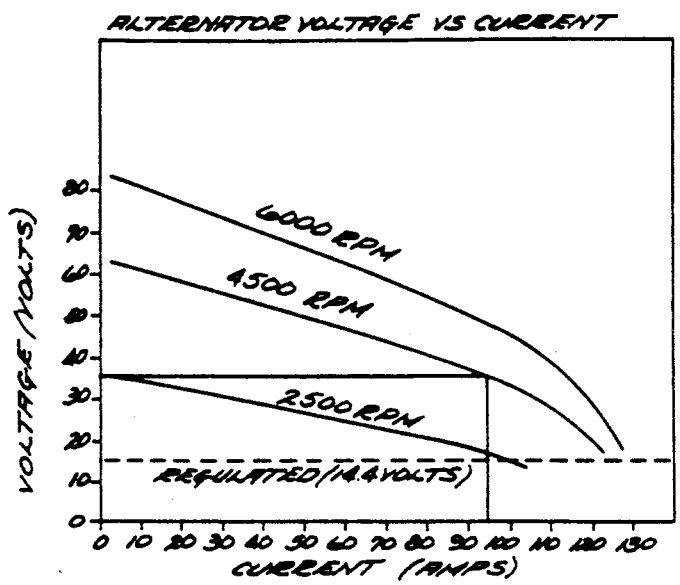
FIG. 4 is a graph showing voltage versus current for several alternator speeds of a typical automotive alternator.
Figure 5:
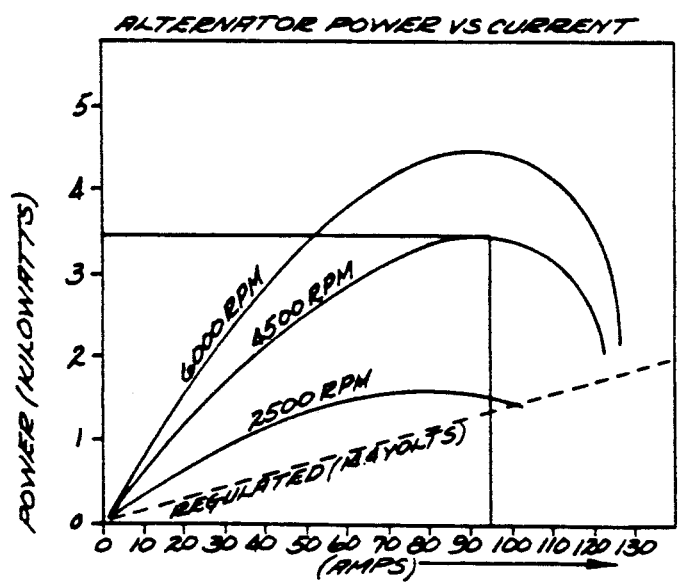
FIG. 5 is a graph showing power versus current for the same alternator speeds and the same alternator as used for FIG. 4.

Operation of the heater assembly in this way enables one to use an essentially conventional alternator to provide the extra power needed for a supplemental electric heater. With reference to FIG. 4 several curves are as shown derived empirically from a 120 amp alternator showing voltage versus current for different alternator speeds. FIG. 5 showing power versus current indicates the power available at the alternator speeds used in FIG. 4. It will be seen that in the vacinity of 90 amps at most alternator speeds maximum power is obtained from the alternator. Looking at FIG. 5, for example, at 4500 rpm over 3000 watts of power is available if the alternator is operated at approximately 36 volts DC (FIG. 4) but if one were to operate that same alternator at 14.4 DC volts as is done at the present time in conventional automotive vehicles only approximately 1500 watts is obtained. In other words, conventionally the alternator is normally being operated at a value which is not optimum in terms of outputting its maximum amount of power. Apparently this situation has developed as a way of dealing with the constantly changing conditions in the operation of a vehicle in order to provide the power needed for varying current demands.

According to a system made in accordance with FIG. 1, transformer 28 was chosen to have a ratio of approximately 2½ to 1 to operate the alternator at the equivalent DC voltage of approximately 36 volts (14.4 volts×2.5) and was mounted externally of the alternator to facilitate air cooling of the transformer to allow the use of a smaller transformer. The transformer was connected to the stator windings through separate taps installed in the windings. It will be understood, however, that the transformer could be installed in the same housing as the alternator if so desired.

The above described system can be used to supplement a four cylinder type vehicle which has marginal heating system performance to bring it up to an improved performance level. It can also be used in larger six or eight cylinder vehicles in order to greatly diminish the time period required to bring the passenger compartment to a comfortable temperature level. By using approximately two thousand watts from the alternator, air can be heated approximately 40° F. almost instantaneously, i.e. within a matter of five seconds using heater bodies 60, 62, 64. This heat, added to the air stream passing through the main heater significantly decreases the time needed to reach a comfortable temperature level.

Although conventional fixed resistance heaters can be used in carrying out the invention, PTC heaters work particularly well for several reasons.

One reason relates to voltage variations caused by, among other things, use of the transformer. That is, as more or less current is drawn through the transformer, the transformer ratio changes slightly, perhaps in the order of plus or minus ten percent in the instant case. With a fixed resistance heater, since power is dependent upon the square of current, a swing of twenty percent in voltage would cause an even greater change in output power thereby causing noticeably uneven heat output, however a similar change in voltage applied to a PTC heater has only a negligible effect on power, in the order of one percent or less. There are also low voltage conditions which can occur when all the electrical loads in the vehicle are activated and the vehicle's engine is idling. For example, voltage may decrease to 12.5 volts which would result in an equivalent DC voltage of 31 volts available for the heater using a 2½ to 1 transformer. Heat output with a fixed resistance heater would thereby be much more uneven compared to the heat output of a PTC heater.

Other factors involve air flow effected by blower speed and blend door (temperature) position. Use of a fixed resistance heater would necessitate a compromise in performance since measures would have to be taken to avoid heater burn out. That is, the heater would have to be capable of operation at low as well as high fan speeds and with all or a portion of the air flow being bypassed by the position of the blend or vent door. A PTC heater on the other hand automatically adjusts its resistance as its heat dissipation changes without any danger of overheating.

Yet another advantage in using a PTC heater is the ability to control the inrush current upon initial energization. By formulating the material to have a selected low base resistivity at normal ambient temperature and a selected web thickness, the inrush current can be significantly increased to ensure rapid heat up of the PTC bodies. For a heater assembly designed to consume approximately two thousand watts at a steady state condition a heating assembly made in accordance with the invention referred to above was adapted to draw an inrush current approximately twice the steady state value. Thus when the heater is energized, it takes the entire alternator output for five seconds or so while the PTC bodies heat up (perhaps half the time it would otherwise take) and during which time the remaining vehicle loads are energized by the battery. When the heater assembly is energized, the voltage on output lines 20, 22, 24 drops to approximately 24 volts (equivalent DC) which is below the threshold voltage required for current to flow through the transformer since the battery provides approximately 12½ volts on the other side of the transformer. Once the PTC bodies are heated the power requirements automatically throttle back to the two thousand or so watts leaving sufficient power produced by the alternator for the vehicle loads and normal recharging of the battery. Thus the system is such that rapid generation of supplemental or incremental heat to a heating system is optimized.

FIG. 1a shows a modification of the FIG. 1 system in which the output of alternator 12 is rectified through a conventional rectifier 74 similar to rectifier 50 to provide direct current for a heater 76 which could take the form of one or more PTC honeycomb bodies or, if desired, could be some other PTC heater for defogging the side view mirror or the like or could even be a straight resistance heater requiring high power if it is not adversely affected by voltage variations and the like. An example could be a heater in the vehicle's rear window or possibly a front windshield deicing heater.

Figure 6:
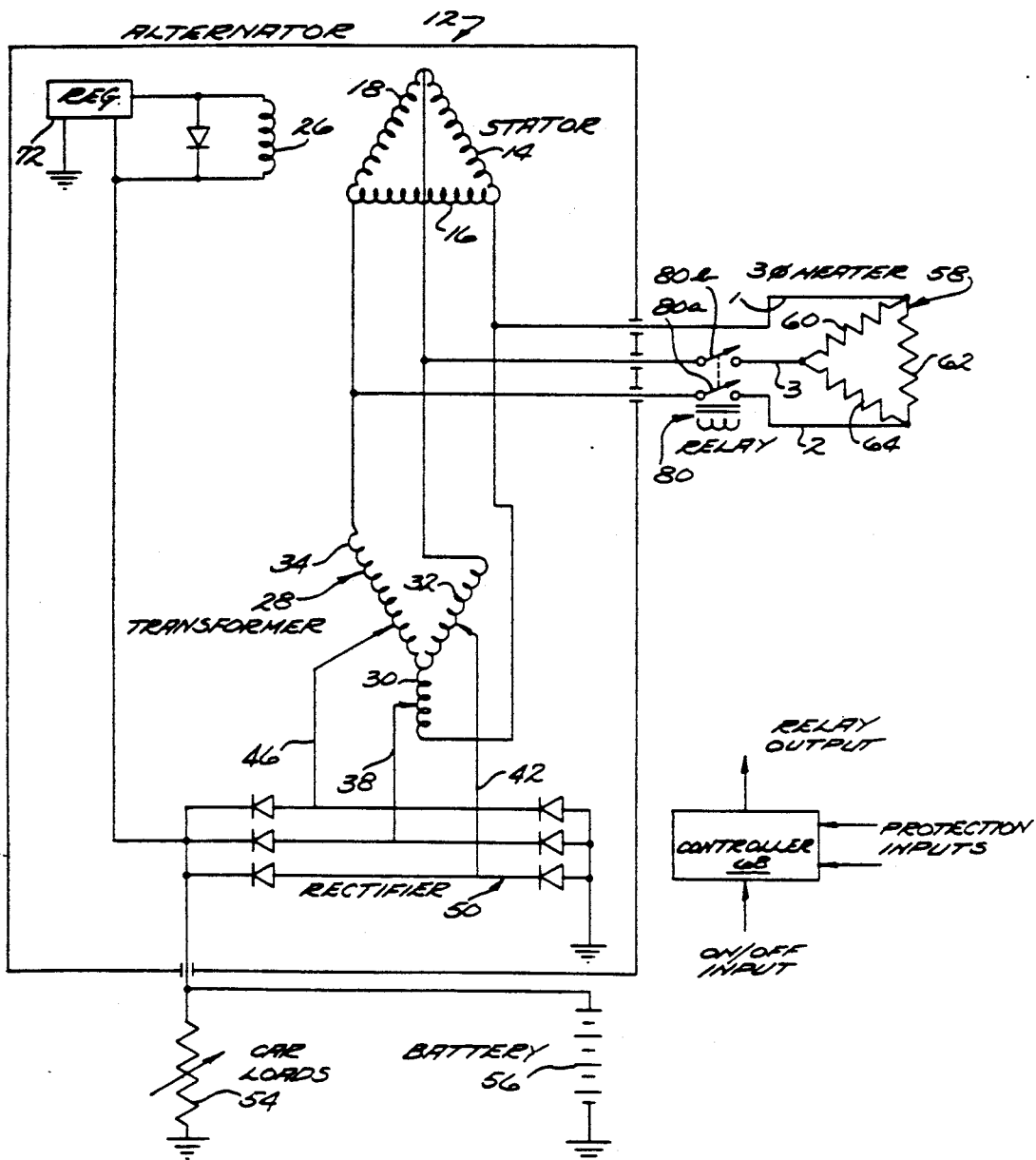
FIG. 6 is a schematic diagram similar to FIG. 1 of an alternate embodiment of the invention.

FIG. 6 shows an embodiment similar to FIG. 1 except that transformer 28 is always electrically coupled to alternator 12 with heating assembly 58 adapted to be energized and deenergized through a relay 80. Relay 80 includes movable switch contacts in at least two of the phase conductors such as 80a in line 2 and 80b in line 3. The transformer windings 30, 32, 34 are permanently connected to rectifier 50 through lines 38, 42, 46 respectively. Thus alternator 12 operates continuously at a higher voltage with relay 80 switching heating assembly in and out of circuit relation with the stator windings as desired. In other respects the operation of the system is the same as that of FIG. 1 described above. This embodiment is particularly advantageous in that the main current of the vehicle is not switched and fewer switches are required for operation. Since there is no main current switching, it may not be necessary to deenergize the alternator field before switching the relays, to thereby simplify or even eliminate controller 68.

It should be understood that although preferred embodiments of the novel and improved heating system have been described in detail for illustrating the invention, this invention includes all modifications and equivalents of the described embodiments falling within the scope of the appended claims.

What is claimed is:

1. An electrical system for an automobile having an engine and a plurality of electrical loads comprising an alternator, the alternator having an alternator output means and having a field winding driven by the engine to provide electrical power to such loads, a voltage regulator for controlling the field winding energization, a battery for supplementing the electrical power provided by the alternator when needed and for turning over the engine upon start up, the alternator having a stator with three windings, the windings coupled together to provide a three phase voltage output on the alternator output means, a rectifier, the rectifier having input and output means, the rectifier output means connected to a circuit including the plurality of electrical loads, the battery and the voltage regulator, a three phase electrical resistance heater means, step-down transformer means having input and output means, switch means to selectively couple the alternator output means to the transformer input means and the heater means along with coupling the transformer output means to the rectifier input means and to couple the alternator output means to the rectifier input means bypassing the transformer means whereby the alternator is caused to produce a higher voltage when the transformer output means are coupled to the voltage regulator than when the transformer means is bypassed.

2. An electrical system for an automobile according to claim 1 in which the electrical resistance heater means is composed of material having a positive temperature coefficient of resistivity.

* * * * *